June 28, 1966     W. H. BUMPOUS     3,258,746

AUTOMOTIVE ANTI-COLLISION BEACON

Filed Aug. 30, 1965     2 Sheets-Sheet 1

INVENTOR:
WILLIAM H. BUMPOUS

BY Harrington A. Lackey
ATTORNEY

United States Patent Office 3,258,746
Patented June 28, 1966

3,258,746
AUTOMOTIVE ANTI-COLLISION BEACON
William H. Bumpous, 100 S. Bellevue Drive,
Nashville, Tenn. 37205
Filed Aug. 30, 1965, Ser. No. 483,597
11 Claims. (Cl. 340—71)

This application is a continuation-in-part of patent application S.N. 254,148, filed January 28, 1963.

This invention relates to an anti-collison beacon system for a vehicle, and more particularly to a motor vehicle beacon system which will register an unmistakable, distinct and immediate signal indicating the deceleration of the vehicle.

Heretofore, the deceleration of a motor vehicle, such as an automobile, has been indicated to a trailing motorist merely by the rear tail light, or tail lights, which traditionally has been an incandescent light or lamp energized by the actuation of the brake pedal. Thus, the conventional tail light indicates only that the brake pedal has been applied by the operator of the vehicle, and is actually vague as to the rate of deceleration of the vehicle. The illuminated tail light thus could indicate to the trailing motorist that (1) the brake has been applied forcefully and abruptly in an emergency situation and that the vehicle is decelerating rapidly; (2) the brake pedal has been applied gradually so that the deceleration of the vehicle is gradual; (3) the operator of the vehicle is "riding" the brake pedal and might apply the brakes, but the vehicle is progressing at a constant velocity or is very gradually decelerating; or (4) the vehicle has been stopped and is motionless.

In addition to the conventional tail light for a motor vehicle, other vehicle light signals have been developed in which the energization of the illuminant is a function of the deceleration of the vehicle. Such systems have included a mercury switch mounted at an angle to the normally horizontal, longitudinal axis of the vehicle in such a manner that deceleration of the vehicle causes a mercury globule to ascend the inner wall of the inclined tube and close the contacts of a circuit including an energy source such as a battery, and an incandescent lamp. However, such signal or beacon systems incorporating solely incandescent illuminants are impractical because such illuminants are not sufficiently distinguishable to adequately and quickly warn a trailing motorist of the deceleration condition of the leading vehicle. Moreover, the time consumed for the illumination of an incandescent lamp is excessive where time is of the essence in conveying the desired signal to a trailing motorist in this age of high speeds, heavy traffic and limited spacing between traveling vehicles.

Twenty-five years ago, the rear-end collison between vehicles was almost non-existent. In 1962, the rear-end collison accounted for 23% of the accidents occurring on the city streets of Los Angeles; 43% of the nighttime accidents on the New Jersey and Pennsylvania turnpikes; and a full 50% of the accidents on the freeways of Los Angeles. The signalling equipment on the automobile of twenty-five years ago, the 1940 model, still prevails. With only minor exceptions, no improvements have been made since then. As the foregoing statistics indicate, motoring is more dangerous than soldiering.

In 1940, the very thought of a 100-car chain-reaction accident surely would have seemed quite absurd; however, today it is a stark reality. Driving conditions have changed very radically, but the driving signalling equipment has not. The 1940 model car offers as much rear-end-collision protection as the 1965 model, which is very little.

It is therefore an object of this invention to provide a beacon system for a motor vehicle which will overcome the disadvantages of the above-described systems and which will provide an immediate, unmistakable signal of the deceleration condition of the vehicle.

Another object of this invention is to provide an automotive vehicle beacon system particularly adaptable for signalling abrupt and rapid deceleration of a vehicle to trailing motorists in a minimum of time.

A further object of this invention is to provide a vehicle beacon system incorporating an illuminant of high intensity which is immediately responsive to the deceleration of the vehicle and is energized in a minimum of time.

Another object of this invention is to provide a motor vehicle beacon system incorporating a plurality of beacon units in which high intensity illuminants are employed for signalling higher values of deceleration, and incandescent lamps are employed to signal the lower values of deceleration of the vehicle.

A further object of this invention is to provide a motor vehicle beacon system incorporating a plurality of illuminants in which the high intensity illuminants are employed to indicate the higher values of deceleration of the vehicle, and the illuminants are progressively energized as the values of deceleration of the vehicle increase.

A further object of this invention is to provide a motor vehicle beacon system having means for indicating the operativeness of the system to the operator of the vehicle.

Another object of this invention is to provide a motor vehicle beacon system having means for testing the operativeness of the system.

Another object of this invention is to provide a motor vehicle beacon system incorporating a photoflash bulb as the illuminant.

A further object of this invention is to provide a motor vehicle beacon system which is a direct function of the deceleration of the vehicle, and is not responsive to the brake pedal, brakes or any other mechanical element of the vehicle.

Further objects and advantages of the invention will be apparent from the following description taken in conjunction with the drawings, wherein.

Figure 1:
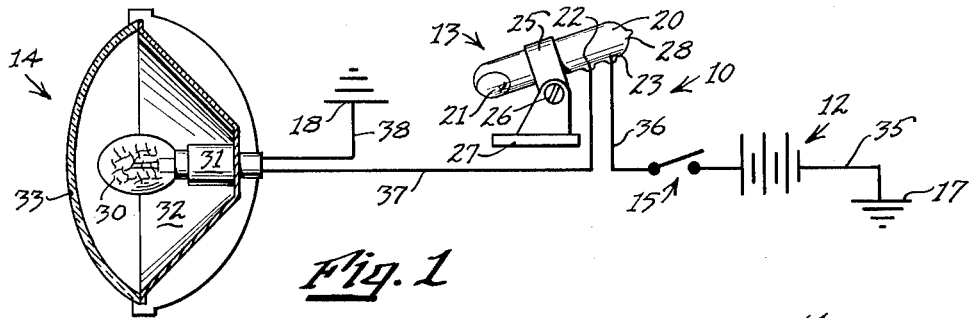
FIG. 1 is a schematic diagram of one form of the invention incorporating a photoflash bulb, in inoperative position.

Referring now to the drawings in more detail, FIG. 1 discloses a preferred form of a motor vehicle beacon system incorporating a continuous, uninterrupted electrical circuit 10, including in series a source of electrical energy, such as the battery 12, a G-sensitive switch 13 and the illuminating unit 14.

A manual switch 15, accessible to the operator of the vehicle, may be incorporated in the circuit 10, if desired. Such a switch 15 is preferred, so that the circuit 10 may be opened for maintenance, including the repair or replacement of elements, such as the illuminant, without exposing the illuminant to discharge or exposing the maintenance personnel to electrical shock.

Although the series circuit 10 may be a closed loop, it is shown in FIG. 1 as being a single line or conductor, grounded at its opposite ends 17 and 18. Although the source of electrical supply to the circuit 10 is disclosed as a battery 12, it will be understood that the E.M.F.

of the circuit 10 may be of any other desired form, but preferably with a supply capability of approximately 6–12 volts.

The G-sensitive switch 13 is responsive to the deceleration of the vehicle, and is adapted to be set at any desired threshold value of deceleration for automatically closing the switch, to energize the circuit 10.

The particular switch 13 disclosed in FIG. 1 includes an elongated, cylindrically shaped, transparent tube 20, such as glass, completely closed, and containing a small globule of mercury 21, which normally rests, by virtue of gravity, at the lowest end of the tube 20. Adjacent to the upper end of the tube 20 is a pair of electrical contacts 22 and 23 exposed on the inner wall of the tube 20 and spaced apart sufficiently to be bridged by the globule 21, when the globule 21 has been forced to that position by the deceleration of the vehicle. The tube 20 may be supported in a bracket 25 which is pivotally mounted by means of an adjustment screw or pin 26 to a stationary standard 27, which may be rigidly secured to any fixed portion of the vehicle, not shown. By adjusting the screw 26, the bracket 25 may be pivoted about the standard 27 to move the tube 20 to various angular positions relative to the longitudinal axis of the vehicle. As viewed in FIG. 1, the upper end 28 of the tube 20 is directed forwardly of the vehicle.

Thus, when the vehicle is decelerated, the standard 27, and consequently the tube 20, also decelerates with the vehicle at the same rate. However, the mercury globule 21, not being attached to the vehicle, rides upwardly along the inclined bottom wall of the tube 20, and if the value of deceleration is sufficient, the globule 21 will bridge the contacts 22 and 23 to close the circuit 10. It will be apparent that the adjustment of the tube 20 toward smaller angles with the horizontal will require lower threshold values of deceleration to close the circuit 10, while the greater the angle that the tube 20 makes with the vehicle, the greater the threshold value of deceleration will be required for closing the switch 13.

The most important element in the circuit 10 is the illuminating unit 14. As disclosed in FIG. 1, one form of the illuminating unit 14 includes an illuminant, such as a photoflash bulb 30 of small design, of any convenient shape, and occupying a volume of about 16 cubic centimeters. However, it is vital that the photoflash bulb 30, or any equivalent illuminant, must have a total output of at least 15,000 lumen-seconds, a maximum illuminating or burning duration of approximately 30 milliseconds, and a minimum intensity of 500,000 lumens. The Focal Plane No. 6 or Power Mite M–5 manufactured by the General Electric Company is exemplary of a suitable photoflash bulb 30. Another characteristic of the illuminant 30 employed in this invention is that the reaction time, or the time required for the illuminant to illuminate after energization, must be 0–20 milliseconds, or in other words, practically instantaneous. The photoflash bulb 30 does energize within the required reaction time.

On the other hand, an incandescent lamp such as used in the conventional brake light or tail light requires about 0.10 second to heat up to 90 percent of its peak incandescence, and the conventional headlight requires 0.15 second for its filament to be heated to incandescence. Thus, the reaction time of 0–20 milliseconds for applicant's illuminant is in marked contrast to the inadequately slow times for incandescence of an incandescent lamp.

As disclosed in FIG. 1, the photoflash bulb 30 is mounted in a socket 31 in a polished reflector 32, which assists in directing the light from the illuminant 30 rearwardly of the vehicle. Although a truncated reflector 32 is disclosed in FIG. 1, a polished concave parabolic reflector is preferred. The center of curvature of the parabolic reflector may vary from 40–100 millimeters, and the illuminant should be placed as close as possible to the principal focus.

FIG. 1 also discloses a lens or light filter 33 which may be optionally employed to alter the color of the light emitted from the illuminant 30, if desired.

The wires or conductors connecting the various elements of the circuit 10 should be well insulated and have low resistance, and be about 12,500 circular mils with a specific resistance of about 10.4 ohms per mil foot. As disclosed in the drawings, the battery 12 is connected to ground 17 by conductor 35, while the other side of the battery 12 is connected to the contact 23 in the tube 20 by a conductor 36, including the manual switch 15. The electrical contact 22 is connected to one side of illuminant socket 31 through conductor 37, while the other side of the illuminant socket 31 is connected to ground 18 by conductor 38. All the conductors 35, 36, 37 and 38 are identical in size and resistance having the same values as the above described wiring.

The illuminating unit 14 is preferably mounted on the vehicle where it can be clearly seen from the rear of the vehicle by trailing motorists. The illluminating unit 14 may be mounted on the rear-package shelf in close proximity to the rear window of the vehicle, on or adjacent to the rear bumper, or high atop a mast extending above and facing rearwardly of the vehicle.

Figure 2:
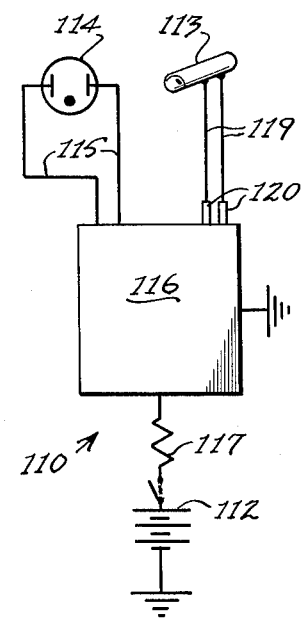
FIG. 2 is a schematic view of the invention incorporating a modified form of a high intensity illuminant.

Although the photoflash bulb 30 is a preferred form of illuminant because of its low cost, convenience, simplicity and mechanical and electrical reliability, it will be understood that other illuminants may be employed so long as they emit at least a minimum of 15,000 lumen-seconds during a maximum period of approximately 30 milliseconds. One example of another such illuminant is the high-voltage, gas-filled, electronic discharge tube 114 disclosed in FIG. 2, such as a discharge tube manufactured by Blaupunkt Electronic GmbH. As disclosed in FIG. 2, the discharge tube 114 is connected by high voltage leads 115 to the conventional electronic device 116 for increasing low D.C. voltage to high D.C. voltage for capacitor storage. An example of such a device 116 is the Ultrablitz Expert IV, manufactured in Germany by Deutsche Electronic GmbH. The device 116 is normally powered by five 1.5-volt dry cells for a total of 7.5 volts, or can be powered by a 12-volt battery 112 through a resistor 117 to produce an equivalent wattage consumption in device 116. The G-sensitive switch 113, identical to the switch 13, is connected through leads 119 to the switch terminals 120 of the device 116 to trigger the beacon circuit 110, in a similar manner to the actuation of circuit 10.

Another improtant feature of this invention is that although the tube 20 of the G-sensitive switch 13 may be set at any desired angle with respect to the normally horizontal longitudinal axis of the vehicle, in order for the switch 13 to properly function in the circuit 10, the tube 20 must be set at an angle to the horizontal of at least 16.7 degrees. The natural tangent of the angle 16.7 degrees is 0.30, which also equals the coefficient or decimal part of the acceleration of gravity (G) corresponding to the deceleration of the vehicle required to close the switch 13, or the threshold value of deceleration.

Considering the statics and dynamics of the vehicle and the mercury globule 21 with respect to the inclined tube 20, the weight (W) of the mercury (Hg) multiplied by the sine of the angle of inclination of the tube 20 ($\theta$) must equal the mass (M) of mercury (Hg) × acceleration of the mercury (A) × cosine $\theta$. Expressed mathematically, $$W \sin \theta = MA \cos \theta$$

Assuming $G$ = acceleration of gravity, $$MG \sin \theta = MA \cos \theta$$

$$A = \frac{G \sin \theta}{\cos \theta} = G \tan \theta = CG$$

Where $C$ = any positive coefficient.

Thus, since .30 G is the critical minimum threshold value of deceleration above which exceptionally brilliant and immediate signals are required in the interest of safety, then the G-sensitive switch 13 must be inclined at that angle (θ) whose tangent equals .30, namely, 16.7 degrees. If it is decided that the minimum threshold value of deceleration should be .35 G then the tube 20 would be set at 19.3 degrees, the angle whose tangent is .35.

It will be understood, that where the longitudinal axis of the vehicle is not normally horizontal, such as in descending or ascending a hill, the signal of the circuit 10 will not accurately designate the deceleration of the vehicle with respect to the road surface over which it is travelling. For example, when the vehicle is moving downhill or descending, the circuit 10 will be more sensitive and will energize the illuminant 30 sooner than usual, because the tube 20 is inclined at an angle to the horizontal less than its angle θ, which is the angle between the tube 20 and the longitudinal axis of the vehicle. On the other hand, when the vehicle is ascending a grade, the force of deceleration must be greater than its present threshold value before the illuminant will be energized. However, this discrepancy in the signal of the beacon system 10 on grades is desirable, since a trailing motorist should have more warning of the lower deceleration value of a vehicle moving downgrade than of a vehicle moving upgrade.

The operation of the invention can now be readily understood from the description of the above circuit 10. With the manual switch 15 closed, and the tube 20 set at the desired angle θ whose tangent equals the cofficient C of the minimum threshold value of deceleration, which should be at least .30, the system 10 is operative. During the movement of the vehicle, if the operator has to stop or slow down suddenly, and his rate of deceleration of the vehicle exceeds .30 G, the mercury globule 21 ascends the ramp or inclined bottom wall of the tube 20 by its own force of acceleration until it bridges the contacts 22 and 23 to close the circuit 10. Electrons in the battery 12 are immediately transferred through the low resistance conductor 36, mercury globule 21, conductor 37, photoflash bulb 30, conductor 38 and through the grounds 18–17 to return through the conductor 35 to the battery 12. Because of the low resistance of the conductors 35, 36, 21, 37 and 38 and the low reaction time, 0–20 milliseconds, of the photoflash bulb 30, and the brief illumination period of approximately 30 milliseconds, the brilliant light signal produced by the photoflash bulb is practically immediately transmitted from the rear of the vehicle. Moreover, since the photoflash bulb 30 or any equiavlent illuminant, is of such high intensity that it will produce the minimum of 500,000 lumens, then the signal of the photoflash bulb 30 is so brilliant that it will distinguish from other stimuli in the area, such as the conventional tail lights of the vehicle, illuminated signs, street lights, lights of approaching traffic, and other distractive stimuli such as radios, straying animals, conversation, fumes or mechanical noises. Thus, the stimulus of 500,000 lumens within a brief illuminating period of 30 milliseconds will so stimulate the visual senses of any trailing motorist that he will recognize and distinguish the signal of deceleration of the leading vehicle without any further notice or warning.

One example of the operation of this invention will now be illustrated by assuming that a leading car and a trailing car are travelling at 68 miles an hour upon a highway and are separated by only 100 feet. For the purpose of this illustration, it is also assumed that certainly the leading car, and preferably also the trailing car, are equipped with the beacon system 10. If the leading motorist applies his brakes sufficiently to cause a deceleration of at least .30 G to energize the photoflash bulb 30, or other equivalent illuminant, the trailing motorist has only one second available within which to avoid impact with the leading vehicle. In this one second, the following four events must occur in order to avoid collision:

(1) First, the activation of the signal will require about 10% of the available time, or in other words, 0.10 second. In this time, the mercury globule 21 must move up the tube 20 to close the contacts 22 and 23, the electrons must move through the circuit 10, and the illuminant 30 must be energized to emit the high intensity light signal.

(2) A portion of the time is required for perception of the signal by the trailing motorist.

(3) A portion of the time is required for mental decision by the trailing motorist.

(4) The major portion of the time, namely a full 75% of the time, or .75 second, is required for the trailing motorist to react with his brake foot.

Since .10 second is required for activating the signal and .75 second is required for reaction, only .15 second remains for perception and mental decision. For an illuminant that is not intense and distinguishable, such as a conventional incandescent brake light or tail light, the trailing motorist will not even have .15 second, but only 0–.05 second, to perceive and make a mental decision to brake his vehicle in time to prevent a collision into the rear end of the leading car. Thus, the difference between the beacon system 10, and particularly the high intensity illuminant 30, contemplated by this invention, and conventional brake light systems incorporating incandescent lamps can be the difference between life and death.

It should be borne in mind that the beacon system 10 is designed to indicate a rapid, emergency or even panic deceleration, and not to indicate normal stopping or gradual slowing down of a vehicle in which the deceleration forces are less than .30 G. The beacon system 10 is not designed to replace the conventional stop light, but is a supplement for the conventional and existing lighting system on a motor vehicle.

It is therefore of the utmost importance that this invention incorporate an illuminant not only of high intensity but also which can be energized immediately with a brief illumination period to produce a clear, unmistakable and highly distinguishable signal. The brevity of the period of illumination, rather than a continuous emission of light, is considered almost as important as the high intensity of illumination, in order to create a greater sense of warning and urgency to the trailing motorist.

Figure 3:
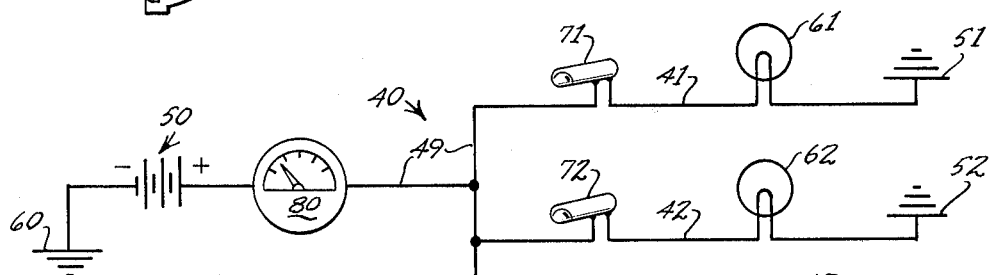
FIG. 3 is a schematic diagram of a modification of the invention incorporating a plurality of beacon units, and means for indicating the deceleration of the vehicle to the operator.

Referring now to the modified beacon system 40 of FIG. 3, a plurality of beacon units or circuits 41, 42, 43, 44, 45, 46, 47 and 48, are connected in parallel, and supplied through a common line 49 with electrical energy from any convenient electrical source of E.M.F., such as battery 50, which is grounded at 60. Each of the individual beacon circuits 41–48 are also grounded at 51, 52, 53, 54, 55, 56, 57 and 58. The individual beacon circuits 41–45 include incandescent lamps 61, 62, 63, 64 and 65, respectively, each incandescent lamp being connected in series with a G-sensitive switch 71, 72, 73, 74 and 75. Each G-sensitive switch is mounted at progressively greater angles to the longitudinal axis of the vehicle so that the lamps 61–65 are illuminated progressively, as the deceleration force of the vehicle increases. Of course, the illumination of the lamps 61–65 will also be sustained as long as the minimum threshold deceleration value of its corresponding G-sensitive switches are exceeded.

The individual beacon circuits 46, 47 and 48 include illuminants 66, 67, and 68 of high intensity and brief illumination duration, such as the illuminant 30 incorporated in the beacon system 10. Moreover, the G-sensitive switches 76, 77 and 78 connected in series with the illuminants 66, 67 and 68 in the corresponding circuits 46, 47 and 48 are also mounted at progressively steeper angles to the longitudinal axis of the vehicle, with each angle being equal to or exceeding the minimum threshold value of .30 G.

Thus, the beacon system 40 is designed to give a more accurate indication of the deceleration value of the vehicle at any given time within specified ranges. For example, the G-sensitive switches 71–78 may be set at progressively increased angles for minimum threshold deceleration values, such as .03 G for circuit 41, .15 G for circuit 42, .20 G for circuit 43, .25 G for circuit 44, .29 G for circuit 45, .33 G for circuit 46, .45 G for circuit 47, and .50 G for circuit 48. Thus, even in the system 40, the photoflash bulbs or high intensity illuminants 66, 67 and 68 are still used for those decelerations which exceed .30 G and which therefore, demand greater and instantaneous warnings to trailing motorists.

An ammeter 80 is incorporated in the common line 49 of the circuit 40 in order to indicate to the operator of the vehicle the lower deceleration values of his vehicle corresponding to the incandescent lamp circuits 41–45. Thus, as each additional circuit, such as 41, 42, 43, is closed by its corresponding G-sensitive switch, the needle on the ammeter 80 will show correspondingly increased values on the scale to apprise the operator of the approximate value of deceleration.

When the deceleration of the vehicle increases into the range of circuits 46, 47 and 48, the needle on the ammeter 80 will be affected hardly at all, but will still register the highest deceleration value of the incandescent lamps 61–65.

Figure 4:
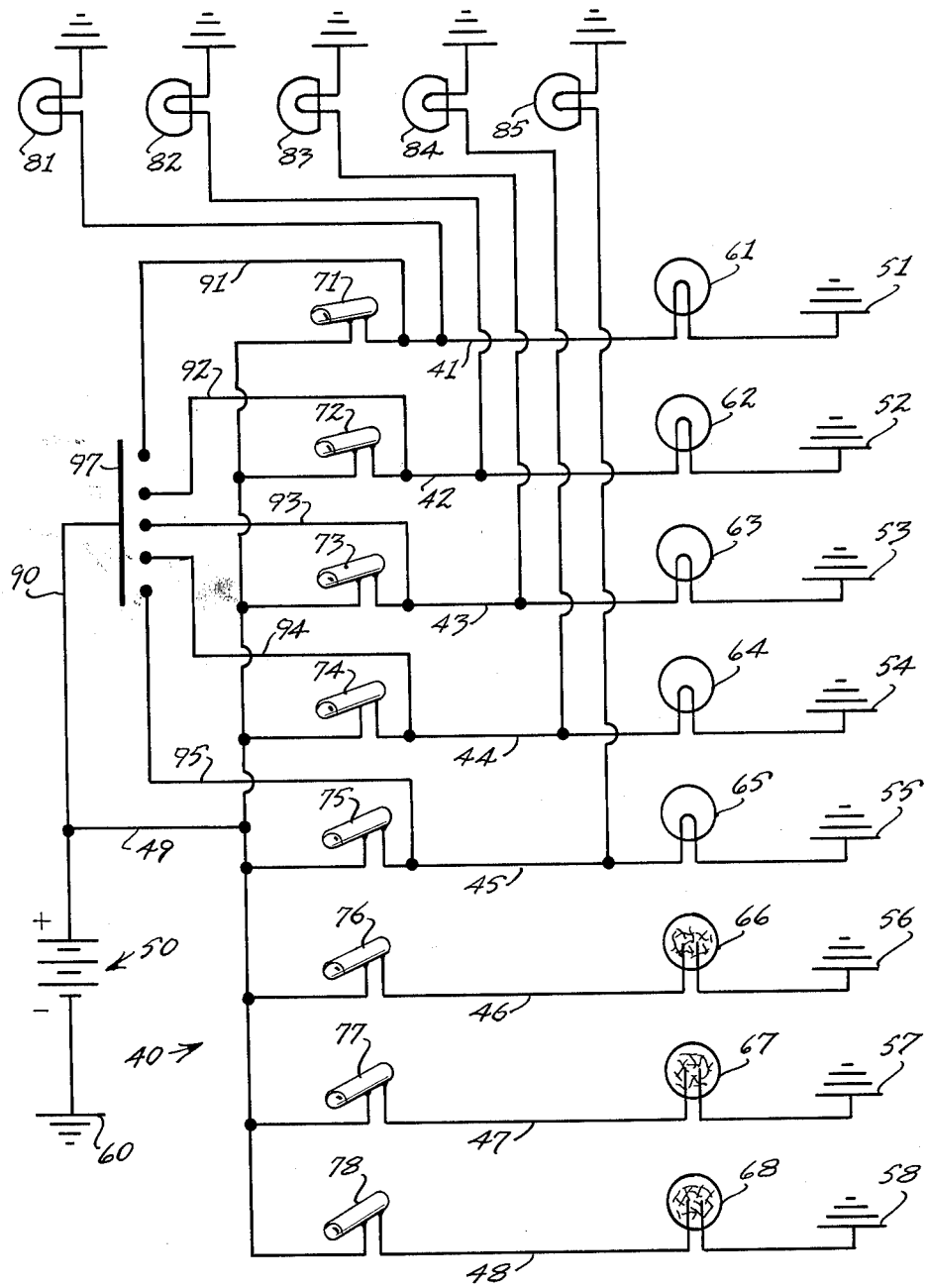
FIG. 4 is a schematic diagram of the invention similar to FIG. 3, but showing a modified form of deceleration indicating means, and a means for testing the incandescent lamp circuits.

FIG. 4 discloses pilot lights 81, 82, 83, 84 and 85 connected in parallel with the corresponding incandescent illuminants 61–65 to indicate to the operator of the vehicle deceleration values of the vehicle when the corresponding G-sensitive switches 71–75 are closed. These pilot lights 81–85 are an alternative indicator to the ammeter 80 disclosed in FIG. 3. FIG. 4 also shows a testing circuit 90 for the incandescent lamps 61–65, including branch lines 91, 92, 93, 94 and 95 bypassing the G-sensitive switches 71–75 and connected in series with the corresponding incandescent lamps 61–65. The branch circuits 91–95 are connected to the main testing circuit 90 through a switch 97. Thus, by closing the switch 97, and viewing the lights 61–65 from the rear of the vehicle, the operator may determine if the lamps 61–65 are properly functioning.

It will of course be understood that the number of illuminants 61–68 in the beacon system 40 of FIGS. 3 and 4 is optional. There might be one or more, or no incandescent lamps 61–65, in combination with one or more high intensity illuminants 66–68, so long as the threshold deceleration value of 0.30 G is observed for the high intensity illuminants.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An anti-collision beacon system for a motor vehicle having a normally horizontal longitudinal axis, comprising:
    (a) an electrically energized illuminant having a minimum intensity of approximately 500,000 lumens, a maximum illuminating duration of approximately 30 milliseconds, a total minimum output of approximately 15,000 lumen-seconds and a reaction time of 0–20 milliseconds, and mounted on said vehicle for full rear-view exposure,
    (b) a source of electrical energy,
    (c) a normally open G-sensitive switch comprising an elongated tube, a mercury globule in said tube, and an electrical contact in one end of said tube,
    (d) means for mounting said tube at an angle to said longitudinal axis so that said contact is forward and normally above said globule,
    (e) said angle establishing a definite threshold value of deceleration of said vehicle which will close said switch, and
    (f) a continuous, uninterrupted electrical circuit including said illuminant, said electrical source and said switch in series, so that said illuminant will be energized only upon closure of said switch.

2. The invention according to claim 1 in which said illuminant is a photoflash bulb.

3. The invention according to claim 1 in which said illuminant is an electronically actuated, high-voltage discharge tube.

4. The invention according to claim 1 in which the value of said angle will be sufficient to establish a minimum threshold value of deceleration of .30 G.

5. An anti-collision beacon system for a motor vehicle comprising:
    (a) a plurality of beacon units, each unit being adapted to be energized at different deceleration values of said vehicle,
    (b) each unit comprising a continuous, uninterrupted electrical circuit including an electrically energized illuminant, and a normally open G-sensitive switch in series,
    (c) an electrical source of energy for each of said beacon units,
    (d) each illuminant being mounted on said vehicle for full rear-view exposure,
    (e) means for mounting each G-sensitive switch on said vehicle to establish a different threshold value of deceleration of said vehicle which will close said corresponding switch,
    (f) said beacon units comprising low-deceleration beacon units for signaling deceleration values of said vehicle below a predetermined value, and high-deceleration beacon units for signaling deceleration values of said vehicle at least as great as said predetermined value,
    (g) the illuminants in said low-deceleration units being incandescent lamps,
    (h) and each illuminant in said high-deceleration units having a minimum intensity of approximately 500,000 lumens, a maximum illuminating duration of approximately 30 milliseconds, a total minimum output of approximately 15,000 lumen-seconds and a reaction time of 0–20 milliseconds.

6. The invention according to claim 5 in which said predetermined value is approximately .30 G.

7. The invention according to claim 6 in which the illuminants in said high-deceleration beacon units comprise photoflash bulbs.

8. The invention according to claim 6 in which the illuminants in said high deceleration beacon units comprise electronically actuated, high voltage discharge tubes.

9. The invention according to claim 5 further comprising indicator means in said beacon system to indicate to the operator of the vehicle the deceleration value of the vehicle.

10. The invention according to claim 5 further comprising a testing circuit, including a branch circuit for each low-deceleration beacon unit connecting each incandescent lamp in series with said source of energy, and by-passing said corresponding G-sensitive switches, when said testing circuit is closed.

11. The invention according to claim 5 in which each G-sensitive switch is mounted at progressively greater angles, increasing from the low-deceleration beacon units to the high-deceleration beacon units.

No references cited.

NEIL C. READ, *Primary Examiner.*

R. M. GOLDMAN, *Assistant Examiner.*